US011620657B2

United States Patent
Arora et al.

(10) Patent No.: US 11,620,657 B2
(45) Date of Patent: Apr. 4, 2023

(54) SYSTEM, METHOD, AND COMPUTER PROGRAM PRODUCT FOR AUTHENTICATING IDENTIFICATION DOCUMENTS

(71) Applicant: Visa International Service Association, San Francisco, CA (US)

(72) Inventors: Sunpreet Singh Arora, San Mateo, CA (US); Kim R. Wagner, Sunnyvale, CA (US)

(73) Assignee: Visa International Service Association, San Francisco, CA (US)

( * ) Notice: Subject to any disclaimer, the term of this patent is extended or adjusted under 35 U.S.C. 154(b) by 345 days.

(21) Appl. No.: 16/652,817

(22) PCT Filed: Oct. 3, 2017

(86) PCT No.: PCT/US2017/054898
§ 371 (c)(1),
(2) Date: Apr. 1, 2020

(87) PCT Pub. No.: WO2019/070240
PCT Pub. Date: Apr. 11, 2019

(65) Prior Publication Data
US 2020/0234309 A1      Jul. 23, 2020

(51) Int. Cl.
*G06Q 30/00*     (2012.01)
*G06Q 30/018*    (2023.01)
(Continued)

(52) U.S. Cl.
CPC .......... *G06Q 30/018* (2013.01); *G06F 16/93* (2019.01); *G06T 3/40* (2013.01); *G06T 5/002* (2013.01);
(Continued)

(58) Field of Classification Search
CPC ......... G06Q 30/018; G06F 16/93; G06T 3/40; G06T 5/002; G06T 7/13; G06T 7/194;
(Continued)

(56) References Cited

U.S. PATENT DOCUMENTS 6,263,091 B1 *   7/2001   Jain ................... G06V 40/1347
                                                           382/125
2004/0153649 A1   8/2004   Rhoads et al.
(Continued)

FOREIGN PATENT DOCUMENTS

CN      103177415 A   *   6/2013
CN      108875451 A   *  11/2018
(Continued)

OTHER PUBLICATIONS

Yang, J., Xiong, N., & Vasilakos, A. V. (2012). Two-stage enhancement scheme for low-quality fingerprint images by learning from the images. IEEE transactions on human-machine systems, 43(2), 235-248.*

(Continued)

*Primary Examiner* — Sarah Lhymn
(74) *Attorney, Agent, or Firm* — The Webb Law Firm

(57) ABSTRACT

Provided is a computer-implemented method for authenticating an identification document. The method includes determining, with at least one processor, whether image data associated with the identification document has at least one predetermined indicia. In response to determining that the image data has the at least one predetermined indicia, the method includes determining whether the at least one predetermined indicia corresponds to at least one invalidation mark on the identification document, and, in response to determining that the at least one predetermined indicia corresponds to the at least one invalidation mark, determining, that the identification document is invalid. In response to determining that the identification document is invalid, the method includes preventing or causing the prevention of at least one action from being performed. A system and computer program product for authenticating identification documents are also disclosed.

20 Claims, 5 Drawing Sheets

(51) Int. Cl.
- *G06T 7/194* (2017.01)
- *G06T 7/13* (2017.01)
- *G06F 16/93* (2019.01)
- *G06T 3/40* (2006.01)
- *G06T 5/00* (2006.01)
- *H04N 1/60* (2006.01)
- *G06V 10/22* (2022.01)
- *G06V 30/414* (2022.01)

(52) U.S. Cl.
CPC ............... *G06T 7/13* (2017.01); *G06T 7/194* (2017.01); *G06V 10/225* (2022.01); *G06V 30/414* (2022.01); *H04N 1/6016* (2013.01); *G06T 2207/30176* (2013.01)

(58) Field of Classification Search
CPC ........ G06T 2207/30176; G06V 10/225; G06V 30/414; H04N 1/6016; G07D 7/185; G07D 7/20; H04L 9/3226; H04L 2209/56
See application file for complete search history.

(56) References Cited

U.S. PATENT DOCUMENTS

| | | | |
|---|---|---|---|
| 2009/0116697 A1* | 5/2009 | Shalaby ................. | G01N 21/55 382/108 |
| 2010/0046814 A1* | 2/2010 | Dewaele .............. | G06V 10/449 382/128 |
| 2011/0057040 A1 | 3/2011 | Jones et al. | |
| 2011/0102628 A1 | 5/2011 | Ciuc et al. | |
| 2014/0111640 A1 | 4/2014 | Counts, Jr. et al. | |
| 2014/0119615 A1* | 5/2014 | Mercolino ............... | G06K 7/00 382/112 |
| 2015/0269739 A1 | 9/2015 | Ho et al. | |
| 2015/0294483 A1* | 10/2015 | Wells ...................... | G06V 20/52 382/103 |
| 2015/0302421 A1* | 10/2015 | Caton ..................... | G06F 21/34 705/17 |
| 2015/0312440 A1 | 10/2015 | Dolev | |
| 2015/0365388 A1 | 12/2015 | Little et al. | |
| 2016/0162734 A1 | 6/2016 | Ross et al. | |
| 2017/0131760 A1* | 5/2017 | Xie ....................... | H04N 5/2257 |
| 2017/0228867 A1* | 8/2017 | Baruch ..................... | G06T 7/12 |

FOREIGN PATENT DOCUMENTS

| | | | | |
|---|---|---|---|---|
| WO | WO-9417493 A1 * | 8/1994 | ............. | G06T 5/003 |
| WO | WO-2008054396 A1 * | 5/2008 | ............... | G06K 9/00 |

OTHER PUBLICATIONS

Thai, D. H., Huckemann, S., & Gottschlich, C. (2016). Filter design and performance evaluation for fingerprint image segmentation. PloS one, 11(5), e0154160.*

Telgad, R., & Deshmukh, P. (2013). Computer Aided Technique for Finger Print Image Enhancement and Minutiae Extraction. International Journal of Computer Applications, 75(17).*

Rani, T. J., & Kothuru, M. (2017). Personal Identification using quality image resulting from binarization and thinning techniques. International Journal of Advanced Scientific and Technical Research, 7(5), 70-82.*

* cited by examiner

SYSTEM, METHOD, AND COMPUTER PROGRAM PRODUCT FOR AUTHENTICATING IDENTIFICATION DOCUMENTS

CROSS-REFERENCE TO RELATED APPLICATION

This application is the U.S. national phase of International Application No. PCT/US2017/054898 filed Oct. 3, 2017, the disclosure of which is hereby incorporated by reference in its entirety.

BACKGROUND

Technical Field

This disclosure relates generally to authenticating identification documents and, in some particular embodiments or aspects, to a system, method, and apparatus for authenticating identification documents.

Technical Considerations

Existing systems and methods for authenticating identification documents, such as a driver's license, a passport, or other government- or agency-issued documents, enable users to authenticate themselves by scanning or otherwise providing an image of the identification document using a mobile device or an unsupervised terminal. In such existing authentication systems and methods, image data associated with the identification document is provided to a remote server where it is determined whether the image data comprises information that deems the identification document as an authentic identification document. Upon determining that the identification document is an authentic identification document, existing systems and methods allow a further action to be performed, such as authenticating the user associated with the identification document for at least one transaction, or approving an application for a user associated with the identification document.

While existing systems and methods for authenticating identification documents are configured to detect whether an identification document contains data that renders the identification document invalid, such as by detecting that a user's driver's license is expired, these existing systems and methods are not configured for detecting whether the identification document has been made invalid by being marked with at least one physical invalidation mark. It is a common practice to invalidate an identification document by making a physical alteration to the document, such as by marking the identification document with a physical invalidation mark. In some embodiments or aspects, the physical invalidation mark is a hole that is punched through the identification document. The inability of existing systems and methods to detect identification documents that have physical invalidation marks may allow an invalid identification document to be authenticated as a valid identification document and used for approving a transaction or an application.

SUMMARY

Accordingly and generally, provided is an improved system, method, and apparatus for authenticating identification documents. Preferably, provided is an improved system, method, and apparatus for authenticating identification documents that can be implemented or used in a network environment or in connection with remote or online transactions or interactions.

According to some non-limiting embodiments or aspects, a computer-implemented method for authenticating an identification document may include determining, with at least one processor, whether image data associated with the identification document has at least one predetermined indicia. In response to determining that the image data has the at least one predetermined indicia, the method may include determining, with at least one processor, whether the at least one predetermined indicia corresponds to at least one invalidation mark on the identification document. In response to determining that the at least one predetermined indicia corresponds to the at least one invalidation mark, the method may include determining, with at least one processor, that the identification document is invalid. In response to determining that the identification document is invalid, the method may include preventing or causing the prevention of, with at least one processor, at least one action from being performed based on determining that the identification document is invalid.

According to some non-limiting embodiments or aspects, the method for authenticating an identification document may include capturing at least a portion of the image data of the identification document using an image generation device. The step of determining whether the image data has the at least one predetermined indicia may include determining, with the at least one processor, locations of corners of the identification document from the image data, determining, with the at least one processor, a foreground portion of the image data within an interior boundary between the corners and a background portion of the image data within an exterior boundary between the corners, segmenting, with the at least one processor, the foreground portion of the image data and the background portion of the image data into a plurality of segments having a predetermined shape, the shape of each of the plurality of segments corresponding to a shape of the at least one predetermined indicia, determining, with the at least one processor, at least one of a spatial domain image transform and a frequency domain image transform for each of the plurality of segments, and determining, with the at least one processor, a region of interest in the foreground portion of the image data based on whether the at least one of the spatial domain image transform and the frequency domain image transform of any of the plurality of segments in the foreground portion of the image data substantially corresponds to the at least one of the spatial domain image transform and the frequency domain image transform of any of the plurality of segments in the background portion of the image data.

According to some non-limiting embodiments or aspects, in response to determining the region of interest in the foreground portion of the image data, the method for authenticating an identification document may include determining, with the at least one processor, whether the region of interest corresponds to the at least one predetermined indicia using at least one of the following: a circular Hough transform, a generalized Hough transform, integro-differential operator, or any combination thereof. In response to determining that the identification document is invalid, the method for authenticating an identification document may include generating, with at least one processor, at least one notification that the identification document is invalid. In response to determining that the image data lacks the at least one predetermined indicia, the method for authenticating an identification document may include generating, with at least one processor, at least one notification that the identification document is valid. The method for authenticating an identification document may further include performing the action based on determining that the image data lacks the at least one predetermined indicia, such as transmitting or causing the transmission of, with at least one processor, the at least one notification to a specified user.

According to some non-limiting embodiments or aspects, the computer-implemented method may further include determining, with the at least one processor, whether the at least one predetermined indicia is a false positive indicia having at least one property corresponding to the at least one invalidation mark. Determining whether the at least one predetermined indicia is the false positive indicia may include comparing at least one property of the at least one predetermined indicia in a foreground portion of the image data with at least one property of a background portion of the image data. The false positive indicia may lack the at least one property of the background portion of the image data.

According to some non-limiting embodiments or aspects, the at least one invalidation mark may be a physical invalidation mark. The at least one invalidation mark may be at least one hole extending at least partially through the identification document. The at least one hole may have at least one of the following: a circular shape, a curvilinear shape, a polygonal shape, or any combination thereof. The identification document may be at least one of the following: a driver's license, a passport, a security document, a government-issued document, an identification document, or any combination thereof.

According to some non-limiting embodiments or aspects, receiving the image data of the identification document may include receiving the image data of the identification document from at least one of the following: an image generation device, a camera, a scanning device, a laser sensor, an image sensor, or any combination thereof. The method for authenticating an identification document may further include performing an image processing operation on at least a portion of the image data after receiving the image data. Performing the image processing operation may include at least one of the following: performing a subsampling operation on the image data, performing an image segmentation operation on the image data, converting the image data to grayscale after receiving the image data, performing a blurring operation on the image data (such as a Gaussian blurring operation), performing a binarization technique on the image data, performing an edge detection operation on the image data, or any combination thereof.

According to some non-limiting embodiments or aspects, performing the image subsampling operation may include reducing a size of an image file containing the image data. Performing the image segmentation operation on the image data may include separating a foreground portion of the image data from a background portion of the image data using at least one of a spatial domain image transform and a frequency domain image transform, such as a corner detection operation or an image histogram. Performing the binarization technique on the image data may include separating the image data into foreground pixels and background pixels. Performing an edge detection operation on the image data may include identifying a region of interest in the image data based on at least one of a spatial domain image transform and a frequency domain image transform of the image data.

According to some non-limiting embodiments or aspects, the action that is prevented from being performed by the method for authenticating an identification document may include at least one of the following: authenticating a user associated with the identification document for at least one transaction, wherein the at least one transaction comprises a transaction amount greater than a predetermined threshold value, authenticating a user associated with the identification document for at least one transaction, wherein the at least one transaction comprises a transaction volume greater than a predetermined threshold value, issuing a digital financial instrument to a user associated with the identification document, storing user profile data of a user associated with the identification document, approving an application for a user associated with the identification document, or any combination thereof.

According to some non-limiting embodiments or aspects, a system for authenticating an identification document may include at least one processor. The at least one processor may be programmed or configured to determine whether image data associated with the identification document has at least one predetermined indicia. In response to determining that the image data has the at least one predetermined indicia, the at least one processor may be further programmed or configured to determine whether the at least one predetermined indicia corresponds to at least one invalidation mark on the identification document. In response to determining that the at least one predetermined indicia corresponds to the at least one invalidation mark, the at least one processor may be further programmed or configured to determine that the identification document is invalid. The at least one processor may be further programmed or configured to prevent or cause the prevention of at least one action from being performed based on determining that the identification document is invalid.

According to some non-limiting embodiments or aspects, the at least one processor may be further programmed or configured to capture at least a portion of the image data of the identification document using an image generation device. The at least one processor may be further programmed or configured to perform an image processing operation on at least a portion of the image data. The image processing operation may include determining, with the at least one processor, locations of corners of the identification document from the image data; determining, with the at least one processor, a foreground portion of the image data within an interior boundary between the corners and a background portion of the image data within an exterior boundary between the corners; segmenting, with the at least one processor, the foreground portion of the image data and the background portion of the image data into a plurality of segments having a predetermined shape, the shape of each of the plurality of segments corresponding to a shape of the at least one predetermined indicia; generating, with the at least one processor, at least one of a spatial domain image transform and a frequency domain image transform for each of the plurality of segments; and determining, with the at least one processor, a region of interest in the foreground portion of the image data based on whether the at least one of the spatial domain image transform and the frequency domain image transform of any of the plurality of segments in the foreground portion of the image data substantially corresponds to the at least one of the spatial domain image transform and the frequency domain image transform of any of the plurality of segments in the background portion of the image data. The at least one processor may be further programmed or configured to, in response to determining that the identification document is invalid, generate at least one notification that the identification document is invalid. The at least one processor may be further programmed or configured to, in response to determining that the image data lacks the at least one predetermined indicia, generate at least one notification that the identification document is valid. The at least one processor may be further programmed or configured to perform the action based on determining that the image data lacks the at least one predetermined indicia. The at least one processor may be further programmed or configured to transmit or cause the transmission of the at least one notification to a specified user.

According to some non-limiting embodiments or aspects, the at least one processor may be further programmed or configured to determine whether the at least one predetermined indicia is a false positive indicia having at least one property corresponding to the at least one invalidation mark. The at least one processor may be further programmed or configured to compare at least one property of the at least one predetermined indicia in a foreground portion of the image data with at least one property of a background portion of the image data. The false positive indicia may lack the at least one property of the background portion of the image data.

According to some non-limiting embodiments or aspects, a computer program product for authenticating an identification document may include at least one non-transitory computer-readable medium including one or more instructions that, when executed by at least one processor, cause the at least one processor to: determine whether image data associated with the identification document has at least one predetermined indicia; in response to determining that the image data has the at least one predetermined indicia, determine whether the at least one predetermined indicia corresponds to at least one invalidation mark on the identification document; in response to determining that the at least one predetermined indicia corresponds to the at least one invalidation mark, determine that the identification document is invalid; and prevent or cause the prevention of at least one action from being performed based on determining that the identification document is invalid.

According to some non-limiting embodiments or aspects, the one or more instructions, when executed by the at least one processor, may further cause the at least one processor to capture at least a portion of the image data of the identification document using an image generation device. The one or more instructions, when executed by the at least one processor, may further cause the at least one processor to perform an image processing operation on at least a portion of the image data. The image processing operation may include determining, with the at least one processor, locations of corners of the identification document from the image data; determining, with the at least one processor, a foreground portion of the image data within an interior boundary between the corners and a background portion of the image data within an exterior boundary between the corners; segmenting, with the at least one processor, the foreground portion of the image data and the background portion of the image data into a plurality of segments having a predetermined shape, the shape of each of the plurality of segments corresponding to a shape of the at least one predetermined indicia; generating, with the at least one processor, at least one of a spatial domain image transform and a frequency domain image transform for each of the plurality of segments; and determining, with the at least one processor, a region of interest in the foreground portion of the image data based on whether the at least one of the spatial domain image transform and the frequency domain image transform of any of the plurality of segments in the foreground portion of the image data substantially corresponds to the at least one of the spatial domain image transform and the frequency domain image transform of any of the plurality of segments in the background portion of the image data. The one or more instructions, when executed by the at least one processor, may further cause the at least one processor to, in response to determining that the identification document is invalid, generate at least one notification that the identification document is invalid. The one or more instructions, when executed by the at least one processor, may further cause the at least one processor to, in response to determining that the image data lacks the at least one predetermined indicia, generate at least one notification that the identification document is valid. The one or more instructions, when executed by the at least one processor, may further cause the at least one processor to perform the action based on determining that the image data lacks the at least one predetermined indicia. The one or more instructions, when executed by the at least one processor, may further cause the at least one processor to transmit or cause the transmission of the at least one notification to a specified user.

According to some non-limiting embodiments or aspects, the one or more instructions, when executed by the at least one processor, further may cause the at least one processor to determine whether the at least one predetermined indicia is a false positive indicia having at least one property corresponding to the at least one invalidation mark. The one or more instructions, when executed by the at least one processor, further may cause the at least one processor to compare at least one property of the at least one predetermined indicia in a foreground portion of the image data with at least one property of a background portion of the image data. The false positive indicia may lack the at least one property of the background portion of the image data.

Further non-limiting embodiments or aspects are set forth in the following numbered clauses.

Clause 1: A computer-implemented method for authenticating an identification document, the method comprising: determining, with at least one processor, whether image data associated with the identification document has at least one predetermined indicia; in response to determining that the image data has the at least one predetermined indicia, determining, with at least one processor, whether the at least one predetermined indicia corresponds to at least one invalidation mark on the identification document; in response to determining that the at least one predetermined indicia corresponds to the at least one invalidation mark, determining, with at least one processor, that the identification document is invalid; and preventing or causing the prevention of, with at least one processor, at least one action from being performed based on determining that the identification document is invalid.

Clause 2: The computer-implemented method of clause 1, further comprising capturing at least a portion of the image data of the identification document using an image generation device.

Clause 3: The computer-implemented method of clause 1 or clause 2, wherein determining whether the image data has the at least one predetermined indicia comprises: determining, with the at least one processor, locations of corners of the identification document from the image data; determining, with the at least one processor, a foreground portion of the image data within an interior boundary between the corners and a background portion of the image data within an exterior boundary between the corners; segmenting, with the at least one processor, the foreground portion of the image data and the background portion of the image data into a plurality of segments having a predetermined shape, the shape of each of the plurality of segments corresponding to a shape of the at least one predetermined indicia; determining, with the at least one processor, at least one of a spatial domain image transform and a frequency domain image transform for each of the plurality of segments; and determining, with the at least one processor, a region of interest in the foreground portion of the image data based on whether the at least one of the spatial domain image transform and the frequency domain image transform of any of the plurality of segments in the foreground portion of the image data substantially corresponds to the at least one of the spatial domain image transform and the frequency domain image transform of any of the plurality of segments in the background portion of the image data.

Clause 4: The computer-implemented method of any of clauses 1-3, further comprising, in response to determining the region of interest in the foreground portion of the image data, determining, with the at least one processor, whether the region of interest corresponds to the at least one predetermined indicia using at least one of the following: a circular Hough transform, a generalized Hough transform, integro-differential operator, or any combination thereof.

Clause 5: The computer-implemented method of any of clauses 1-4, further comprising, in response to determining that the identification document is invalid, generating, with at least one processor, at least one notification that the identification document is invalid.

Clause 6: The computer-implemented method of any of clauses 1-5, further comprising, in response to determining that the image data lacks the at least one predetermined indicia, generating, with at least one processor, at least one notification that the identification document is valid.

Clause 7: The computer-implemented method of any of clauses 1-6, further comprising performing the action based on determining that the image data lacks the at least one predetermined indicia.

Clause 8: The computer-implemented method of any of clauses 1-7, further comprising transmitting or causing the transmission of, with at least one processor, the at least one notification to a specified user.

Clause 9: The computer-implemented method of any of clauses 1-8, further comprising, determining, with the at least one processor, whether the at least one predetermined indicia is a false positive indicia having at least one property corresponding to the at least one invalidation mark.

Clause 10: The computer-implemented method of any of clauses 1-9, wherein determining whether the at least one predetermined indicia is the false positive indicia comprises comparing at least one property of the at least one predetermined indicia in a foreground portion of the image data with at least one property of a background portion of the image data.

Clause 11: The computer-implemented method of any of clauses 1-10, wherein the false positive indicia lacks the at least one property of the background portion of the image data.

Clause 12: The computer-implemented method of any of clauses 1-11, wherein the at least one invalidation mark is a physical invalidation mark.

Clause 13: The computer-implemented method of any of clauses 1-12, wherein the at least one invalidation mark is at least one hole extending at least partially through the identification document.

Clause 14: The computer-implemented method of any of clauses 1-13, wherein the at least one hole has at least one of the following: a circular shape, a curvilinear shape, a polygonal shape, or any combination thereof.

Clause 15: The computer-implemented method of any of clauses 1-14, wherein the identification document is at least one of the following: a driver's license, a passport, a security document, a government-issued document, an identification document, or any combination thereof.

Clause 16: The computer-implemented method of any of clauses 1-15, wherein receiving the image data of the identification document comprises receiving the image data of the identification document from at least one of the following: an image generation device, a camera, a scanning device, a laser sensor, an image sensor, or any combination thereof.

Clause 17: The computer-implemented method of any of clauses 1-16, further comprising performing an image processing operation on at least a portion of the image data after receiving the image data.

Clause 18: The computer-implemented method of any of clauses 1-17, wherein performing the image processing operation comprises at least one of the following: performing a subsampling operation on the image data, performing an image segmentation operation on the image data, converting the image data to grayscale after receiving the image data, performing a blurring operation on the image data (such as a Gaussian blurring operation), performing a binarization technique on the image data, performing an edge detection operation on the image data, or any combination thereof.

Clause 19: The computer-implemented method of any of clauses 1-18, wherein performing the image subsampling operation comprises reducing a size of an image file containing the image data.

Clause 20: The computer-implemented method of any of clauses 1-19, wherein performing the image segmentation operation on the image data comprises separating a foreground portion of the image data from a background portion of the image data using at least one of a spatial domain image transform and a frequency domain image transform, such as a corner detection operation or an image histogram.

Clause 21: The computer-implemented method of any of clauses 1-20, wherein performing the binarization technique on the image data comprises separating the image data into foreground pixels and background pixels.

Clause 22: The computer-implemented method of any of clauses 1-21, wherein performing an edge detection operation on the image data comprises identifying a region of interest in the image data based on at least one of a spatial domain image transform and a frequency domain image transform of the image data.

Clause 23: The computer-implemented method of any of clauses 1-22, wherein the action comprises at least one of the following: authenticating a user associated with the identification document for at least one transaction, wherein the at least one transaction comprises a transaction amount greater than a predetermined threshold value, authenticating a user associated with the identification document for at least one transaction, wherein the at least one transaction comprises a transaction volume greater than a predetermined threshold value, issuing a digital financial instrument to a user associated with the identification document, storing user profile data of a user associated with the identification document, approving an application for a user associated with the identification document, or any combination thereof.

Clause 24: A system for authenticating an identification document, the system comprising: at least one processor, wherein the at least one processor is programmed or configured to: determine whether image data associated with the identification document has at least one predetermined indicia; in response to determining that the image data has the at least one predetermined indicia, determine whether the at least one predetermined indicia corresponds to at least one invalidation mark on the identification document; in response to determining that the at least one predetermined indicia corresponds to the at least one invalidation mark, determine that the identification document is invalid; and prevent or cause the prevention of at least one action from being performed based on determining that the identification document is invalid.

Clause 25: The system of clause 24, wherein the at least one processor is further programmed or configured to capture at least a portion of the image data of the identification document using an image generation device.

Clause 26: The system of clause 24 or clause 25, wherein the at least one processor is further programmed or configured to perform an image processing operation on at least a portion of the image data.

Clause 27: The system of any of clauses 24-26, wherein the image processing operation comprises: determining, with the at least one processor, locations of corners of the identification document from the image data; determining, with the at least one processor, a foreground portion of the image data within an interior boundary between the corners and a background portion of the image data within an exterior boundary between the corners; segmenting, with the at least one processor, the foreground portion of the image data and the background portion of the image data into a plurality of segments having a predetermined shape, the shape of each of the plurality of segments corresponding to a shape of the at least one predetermined indicia; generating, with the at least one processor, at least one of a spatial domain image transform and a frequency domain image transform for each of the plurality of segments; and determining, with the at least one processor, a region of interest in the foreground portion of the image data based on whether the at least one of the spatial domain image transform and the frequency domain image transform of any of the plurality of segments in the foreground portion of the image data substantially corresponds to the at least one of the spatial domain image transform and the frequency domain image transform of any of the plurality of segments in the background portion of the image data.

Clause 28: The system of any of clauses 24-27, wherein the at least one processor is further programmed or configured to, in response to determining that the identification document is invalid, generate at least one notification that the identification document is invalid.

Clause 29: The system of any of clauses 24-28, wherein the at least one processor is further programmed or configured to, in response to determining that the image data lacks the at least one predetermined indicia, generate at least one notification that the identification document is valid.

Clause 30: The system of any of clauses 24-29, wherein the at least one processor is further programmed or configured to perform the action based on determining that the image data lacks the at least one predetermined indicia.

Clause 31: The system of any of clauses 24-30, wherein the at least one processor is further programmed or configured to transmit or cause the transmission of the at least one notification to a specified user.

Clause 32: The system of any of clauses 24-31, wherein the at least one processor is further programmed or configured to determine whether the at least one predetermined indicia is a false positive indicia having at least one property corresponding to the at least one invalidation mark.

Clause 33: The system of any of clauses 24-32, wherein the at least one processor is further programmed or configured to compare at least one property of the at least one predetermined indicia in a foreground portion of the image data with at least one property of a background portion of the image data.

Clause 34: The system of any of clauses 24-33, wherein the false positive indicia lacks the at least one property of the background portion of the image data.

Clause 35: A computer program product for authenticating an identification document, the computer program product comprising at least one non-transitory computer-readable medium including one or more instructions that, when executed by at least one processor, cause the at least one processor to: determine whether image data associated with the identification document has at least one predetermined indicia; in response to determining that the image data has the at least one predetermined indicia, determine whether the at least one predetermined indicia corresponds to at least one invalidation mark on the identification document; in response to determining that the at least one predetermined indicia corresponds to the at least one invalidation mark, determine that the identification document is invalid; and prevent or cause the prevention of at least one action from being performed based on determining that the identification document is invalid.

Clause 36: The computer program product of clause 35, wherein the one or more instructions, when executed by the at least one processor, further cause the at least one processor to capture at least a portion of the image data of the identification document using an image generation device.

Clause 37: The computer program product of clause 35 or clause 36, wherein the one or more instructions, when executed by the at least one processor, further cause the at least one processor to perform an image processing operation on at least a portion of the image data.

Clause 38: The computer program product of any of clauses 35-37, wherein the image processing operation comprises: determining, with the at least one processor, locations of corners of the identification document from the image data; determining, with the at least one processor, a foreground portion of the image data within an interior boundary between the corners and a background portion of the image data within an exterior boundary between the corners; segmenting, with the at least one processor, the foreground portion of the image data and the background portion of the image data into a plurality of segments having a predetermined shape, the shape of each of the plurality of segments corresponding to a shape of the at least one predetermined indicia; generating, with the at least one processor, at least one of a spatial domain image transform and a frequency domain image transform for each of the plurality of segments; and determining, with the at least one processor, a region of interest in the foreground portion of the image data based on whether the at least one of the spatial domain image transform and the frequency domain image transform of any of the plurality of segments in the foreground portion of the image data substantially corresponds to the at least one of the spatial domain image transform and the frequency domain image transform of any of the plurality of segments in the background portion of the image data.

Clause 39: The computer program product of any of clauses 35-38, wherein the one or more instructions, when executed by the at least one processor, further cause the at least one processor to, in response to determining that the identification document is invalid, generate at least one notification that the identification document is invalid.

Clause 40: The computer program product of any of clauses 35-38, wherein the one or more instructions, when executed by the at least one processor, further cause the at least one processor to, in response to determining that the image data lacks the at least one predetermined indicia, generate at least one notification that the identification document is valid.

Clause 41: The computer program product of any of clauses 35-40, wherein the one or more instructions, when executed by the at least one processor, further cause the at least one processor to perform the action based on determining that the image data lacks the at least one predetermined indicia.

Clause 42: The computer program product of any of clauses 35-41, wherein the one or more instructions, when executed by the at least one processor, further cause the at least one processor to transmit or cause the transmission of the at least one notification to a specified user.

Clause 43: The computer program product of any of clauses 35-42, wherein the one or more instructions, when executed by the at least one processor, further cause the at least one processor to determine whether the at least one predetermined indicia is a false positive indicia having at least one property corresponding to the at least one invalidation mark.

Clause 44: The computer program product of any of clauses 35-43, wherein the one or more instructions, when executed by the at least one processor, further cause the at least one processor to compare at least one property of the at least one predetermined indicia in a foreground portion of the image data with at least one property of a background portion of the image data.

Clause 45: The computer program product of any of clauses 35-44, wherein the false positive indicia lacks the at least one property of the background portion of the image data.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

BRIEF DESCRIPTION OF THE DRAWINGS

Additional advantages and details of the disclosure are explained in greater detail below with reference to the exemplary embodiments that are illustrated in the accompanying schematic figures, in which.

DETAILED DESCRIPTION

Figure 1A:
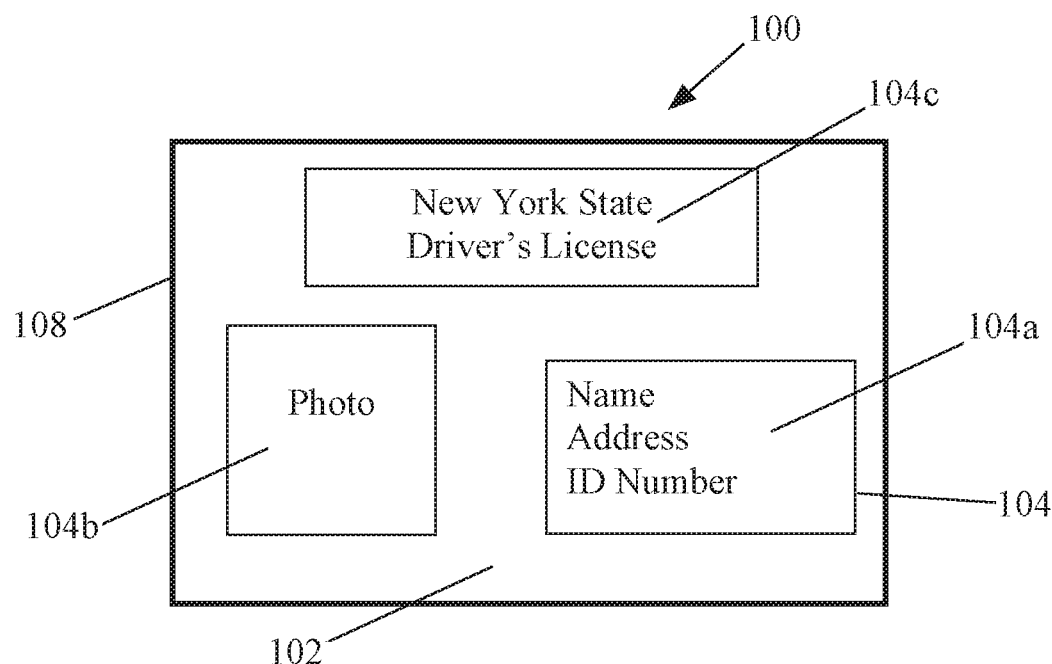
FIG. 1A is a schematic representation of a valid identification document.

Spatial or directional terms, such as "left", "right", "inner", "outer", "above", "below", and the like, are not to be considered as limiting as the disclosure can assume various alternative orientations. For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. As used in the specification and the claims, the singular form of "a," "an," and "the" include plural referents unless the context clearly dictates otherwise. All numbers used in the specification and claims are to be understood as being modified in all instances by the term "about". By "about" is meant a range of plus or minus ten percent of the stated value. Unless otherwise indicated, all ranges or ratios disclosed herein are to be understood to encompass any and all subranges or sub-ratios subsumed therein. For example, a stated range or ratio of "1 to 10" should be considered to include any and all subranges between (and inclusive of) the minimum value of 1 and the maximum value of 10; that is, all subranges or sub-ratios beginning with a minimum value of 1 or more and ending with a maximum value of 10 or less, such as but not limited to, 1 to 6.1, 3.5 to 7.8, and 5.5 to 10. The terms "first", "second", and the like are not intended to refer to any particular order or chronology, but instead refer to different conditions, properties, or elements. By "at least" is meant "greater than or equal to". By "not greater than" is meant "less than or equal to". The term "includes" is synonymous with "comprises".

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. In some embodiments or aspects, a first unit may be in communication with a second unit even though the first unit passively receives data and does not actively transmit data to the second unit. In other embodiments or aspects, a first unit may be in communication with a second unit if an intermediary unit processes data from one unit and transmits processed data to the second unit. It will be appreciated that numerous other arrangements are possible.

As used herein, the term "server" may refer to or include one or more processors or computers, storage devices, or similar computer arrangements that are operated by or facilitate communication and processing for multiple parties in a network environment, such as the internet, although it will be appreciated that communication may be facilitated over one or more public or private network environments and that various other arrangements are possible. Further, multiple computers, e.g., servers, or other computerized devices, e.g., point-of-sale devices, directly or indirectly communicating in the network environment may constitute a "system," such as a merchant's point-of-sale system. Reference to "a server" or "a processor," as used herein, may refer to a previously-recited server and/or processor that is recited as performing a previous step or function, a different server and/or processor, and/or a combination of servers and/or processors. In some embodiments or aspects, as used in the specification and the claims, a first server and/or a first processor that is recited as performing a first step or function may refer to the same or different server and/or a processor recited as performing a second step or function.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "mobile device" may refer to one or more portable electronic devices configured to communicate with one or more networks. In some non-limiting embodiments or aspects, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The term "client device," as used herein, refers to any electronic device that is configured to communicate with one or more servers or remote devices and/or systems. A client device may include a mobile device, a network-enabled appliance (e.g., a network-enabled television, refrigerator, thermostat, and/or the like), a computer, a point of sale (POS) system, and/or any other device or system capable of communicating with a network.

As used herein, the terms "electronic wallet" and "electronic transaction application" refer to one or more electronic devices and/or software applications configured to initiate and/or conduct payment transactions. In some embodiments or aspects, an electronic wallet may include a mobile device executing an electronic wallet application, and may further include server-side software and/or databases for maintaining and providing transaction data to the mobile device. An "electronic transaction provider" may include an entity that provides and/or maintains an electronic wallet for a customer, such as Google Wallet™, Android Pay™, Apple Pay®, Samsung Pay®, and/or other like electronic payment systems. In some non-limiting embodiments or aspects an issuer bank may be an electronic wallet provider.

It is to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

Non-limiting embodiments or aspects of the present disclosure may allow for authenticating an identification document using image data of the identification document. In some transactions, a user's identification document may be used as a means for authenticating the user and allowing a transaction to proceed based on verifying the authentication of the identification document. Determining whether the identification document is a valid identification document is important in preventing a fraudulent use of an invalid identification document. In many cases, invalid identification documents are marked with at least one invalidation mark, such as a physical hole punched through the document. Non-limiting embodiments or aspects of the present disclosure may allow for determining whether the identification document is a valid identification document based on a presence or absence of the at least one invalidation mark on the identification document. In such embodiments or aspects, image data of the identification document may be captured using an image capture device, such as a camera. The image data of the identification document may be used to determine the presence of at least one predetermined indicia. If present, the predetermined indicia may be analyzed to determine whether it corresponds to the at least one invalidation mark on the identification document. Upon determining that the at least one predetermined indicia corresponds to the at least one invalidation mark, a transaction may be prevented from being performed based on determining that the identification document is invalid. Identifying the at least one invalidation mark that renders the identification document invalid limits the potential for using the invalid identification document in a transaction requiring a valid identification document. By preventing a transaction from being performed based on determining that the identification document is invalid because it contains an invalidation mark, significant advantages and enhanced security are provided over existing identification document authentication systems and methods.

Identification Document

Figure 1B:
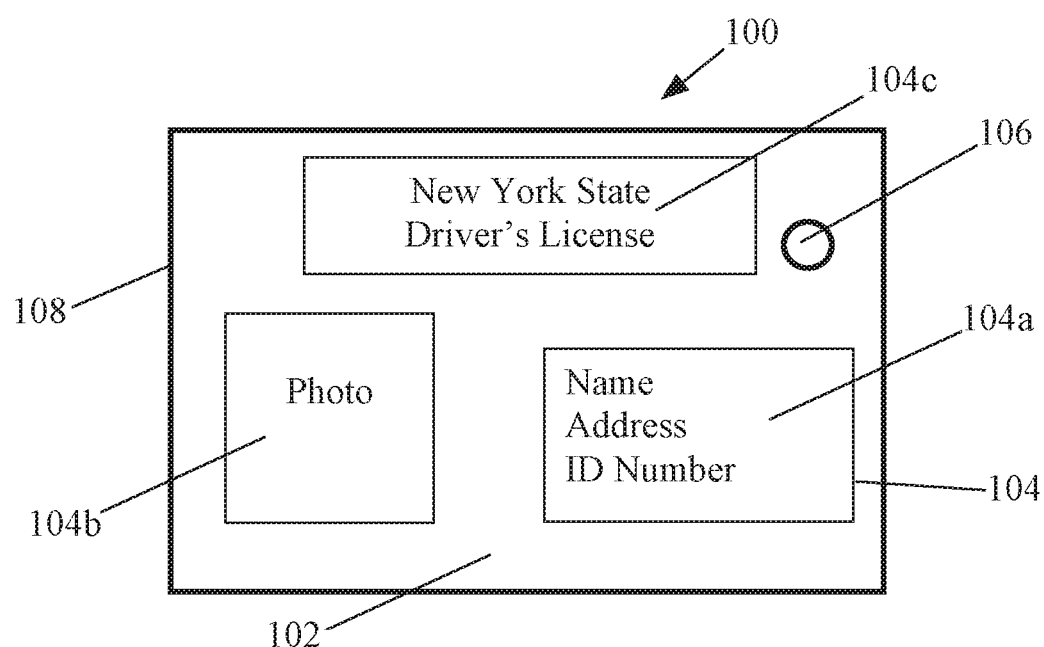
FIG. 1B is a schematic representation of an invalid identification document.

Referring now to FIGS. 1A-1B, an identification document 100 is shown in accordance with a non-limiting embodiment or aspect. As used herein, "identification document" or "identification document 100" refers to any document which may be used to prove a user's identity. The identification document 100 may have alphanumeric or photographic information about the user. The identification document 100 may be of any size and shape. In some embodiments or aspects the identification document 100 may be a card, such as a driver's license card. In other embodiments or aspects the identification document 100 may be a booklet, such as a passport. In further embodiments or aspects, the identification document 100 may be a security document, a government-issued document, an identification document, or any combination thereof. The identification document 100 may be issued by a government agency or other institution where issuing of the identification document 100 is subject to a separate application and identity verification process.

With continued reference to FIGS. 1A-1B, the identification document 100 has at least one identification surface 102 having identification indicia 104 formed thereon. The at least one identification surface 102 may be a top surface, a bottom surface, a side surface, or any other surface of the identification document 100. The identification indicia 104 may be printed, written, embossed, debossed, stamped, stenciled, or otherwise formed on the at least one identification surface 102 of the identification document 100. In some embodiments or aspects, identification indicia 104 has user identification information 104a, such as the user's name, residential address, and other user information. In some embodiments or aspects, identification indicia 104 has photographic information 104b, such as a color or grayscale photograph of the user. In some embodiments or aspects, the identification indicia 104 further has information 104c about the government agency or other institution issuing the identification document 100, such as the name of the issuing organization, an identification number of the identification document 100, the type of identification document 100, and any combination thereof.

Invalidation Mark

With reference to FIG. 1B, the identification document 100 may have at least one predetermined indicia or invalidation mark 106 (hereinafter referred to as "invalidation mark 106"). In some embodiments or aspects, the invalidation mark 106 is provided by a government agency or other institution to indicate that the identification document 100 is no longer a valid document which may be used for identifying the user's identity. In some embodiments or aspects, the government agency or other institution may invalidate the identification document 100 by providing the invalidation mark 106 when the identification document 100 expires (or after a predetermined period), when the identification document 100 is revoked, or for any other reason. In some embodiments or aspects, the user may invalidate the identification document 100 by providing the invalidation mark 106 on the identification document 100. The invalidation mark 106 may have a standardized shape and size, wherein each invalidation mark 106 is the same, regardless of the type of identification document 100. In other embodiments or aspects, the invalidation mark 106 may have a non-standardized shape and size, wherein different shapes and sizes of the invalidation marks 106 are used for different types of identification documents 100.

In some embodiments or aspects, the invalidation mark 106 is a physical invalidation mark 106. In some embodiments or aspects, the invalidation mark 106 may be at least one hole punched through the identification document 100. In such embodiments or aspects, the at least one hole extends through the identification surface 102 between a top surface and a bottom surface of the identification document 100. The invalidation mark 106 may be of any shape or size. The shape of the invalidation mark 106 may be circular, square, triangular, polygonal, curvilinear, star, any other regular or irregular geometric shape, and any combination thereof. The size of the invalidation mark 106 may be between about 3 mm (0.12 in.) and about 10 mm (0.39 in.). In some embodiments or aspects, the entire invalidation mark 106 is contained within an edge or boundary 108 of the identification document 100 such that the original shape of the edge or boundary 108 is not altered after the invalidation mark 106 is provided on the identification surface 102. In other embodiments or aspects, at least a portion of the invalidation mark 106 may alter the original shape of the edge or boundary 108 of the identification document 100.

System and Apparatus for Authenticating an Identification Document

Figure 2A:
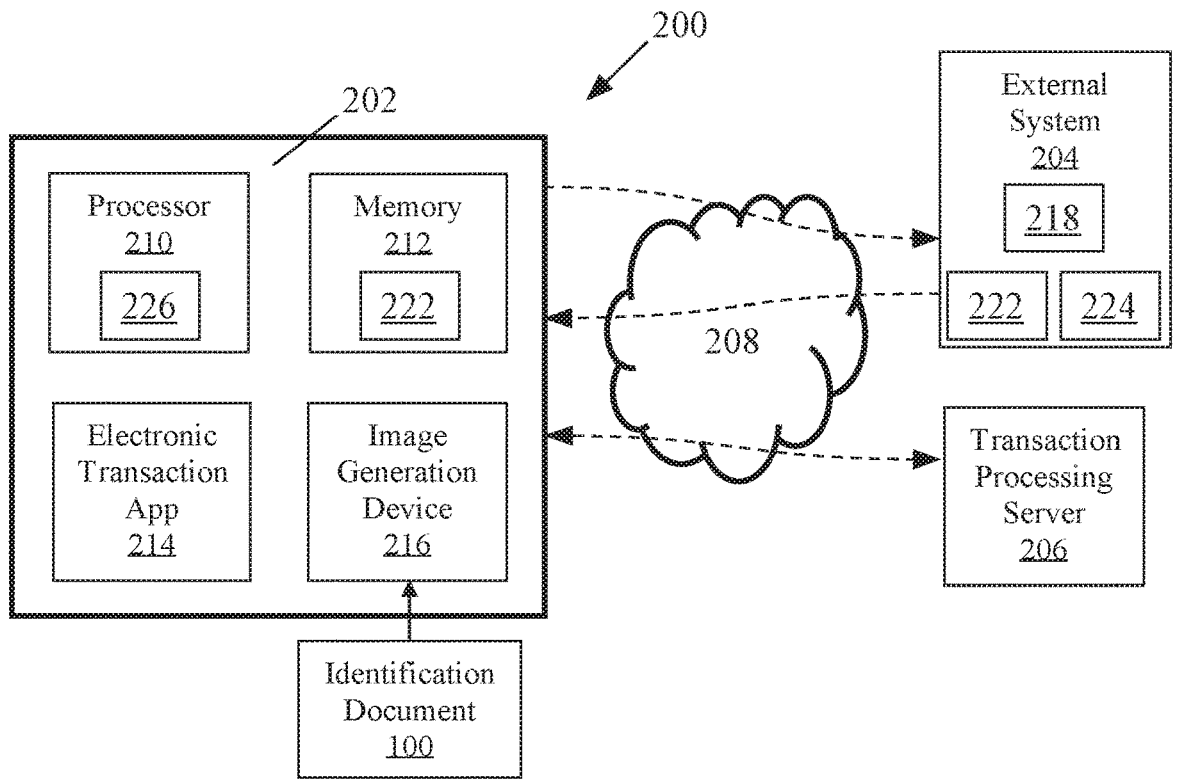
FIG. 2A is a schematic diagram of a system for authenticating identification documents according to a non-limiting embodiment or aspect.

With reference to FIG. 2A, a system 200 for authenticating identification documents 100 is shown according to a non-limiting embodiment or aspect. A client device 202 is in communication with an external system 204 and a transaction processing server 206. The external system 204 may be separate and remote from the transaction processing server 206 or, in other non-limiting embodiments or aspects, the external system 204 may be part of and/or coextensive with the transaction processing server 206. The client device 202 is in communication with the external system 204 and the transaction processing server 206 via a network environment 208, such as a public or private network. However, it will be appreciated that the client device 202 may communicate with the external system 204 and transaction processing server 206 via separate network environments and/or other communication channels.

With continued reference to FIG. 2A, the client device 202 includes and/or is in communication with a processor 210, a memory 212, an electronic transaction application 214, and an image generation device 216. The memory 212, the electronic transaction application 214, and the image generation device 216 may each be in communication with the processor 210. It will be appreciated that various other arrangements may be used. In some non-limiting embodiments or aspects, a web browser, a mobile device operating system, and/or other software application may be used instead of or in addition to an electronic transaction application 214. In some non-limiting embodiments or aspects, the processor 210, memory 212, image generation device 216, and electronic transaction application 214 may be integrated with a mobile device, such as a smartphone or wearable device. In some non-limiting embodiments or aspects, the image generation device 216 may include a camera integrated into a mobile device. In other embodiments or aspects, the image generation device 216 may be a camera associated with the mobile device, a scanning device, a laser sensor, an image sensor, or any combination thereof. In other non-limiting embodiments or aspects, one or more of the processor 210, the memory 212, the image generation device 216, and/or the electronic transaction application 214 may be external to and in communication with the client device 202. In some non-limiting embodiments or aspects, the image generation device 216 may be external to the client device 202 and in communication with the processor 210.

Still referring to FIG. 2A, in non-limiting embodiments or aspects, the client device 202 communicates an authentication request to the external system 204 via the network environment 208. In some embodiments or aspects, the authentication request includes sending image data 222 associated with the identification document 100. In non-limiting embodiments or aspects, the image data 222 may comprise video or photographic representation of the identification document 100. The image data 222 may be presented as one or more strings of binary, alphanumeric, hexadecimal, and/or other data representations. It will be appreciated that the image data 222 may be arranged in any manner and/or type of data structure.

The image data 222 may be stored locally on the client device 202 and transmitted to the external system 204 via the network environment 208. Alternatively, the image data 222 may be captured using the image generation device 216 and transmitted from the client device 202 to the external system 204 via the network environment 208. The image data 222 may be stored on a data storage device 218 of the external system 204 or, in other non-limiting embodiments or aspects, may be stored on one or more other data storage devices or other external systems in communication with the external system 204. The external system 204 may include or more server computers, other client devices, data storage devices, and/or the like, arranged remotely from the client device 202 and programmed or configured to communicate with the client device 202 via the network environment 208.

In some embodiments or aspects, an image processing operation may be performed to the image data 222 prior to or after transmitting the image data 222 to the external system 204. As discussed herein, the image processing operation includes at least one of the following: converting the image data 222 to grayscale after receiving the image data 222; performing a blurring operation on the image data 222 (such as a Gaussian blurring operation); performing an edge detection operation on the image data 222; performing a binarization technique on the image data 222; or any combination thereof.

In some non-limiting embodiments or aspects, and with continued reference to FIG. 2A, the authentication request may be communicated to the external device 204 as part of at least one of the following: authenticating a user associated with the identification document 100 for at least one transaction, wherein the at least one transaction comprises a transaction amount greater than a predetermined threshold value; authenticating a user associated with the identification document 100 for at least one transaction, wherein the at least one transaction comprises a transaction volume greater than a predetermined threshold value; issuing a digital financial instrument to a user associated with the identification document 100; storing user profile data of a user associated with the identification document 100; approving an application for a user associated with the identification document 100, or any combination thereof. In some non-limiting embodiments or aspects, the authentication request may be communicated to the external device 204 as part of at least one of the following transactions: a payment transaction, granting access to a facility, and/or granting access to a system. It will be appreciated, however, that non-limiting embodiments may be used with any transaction involving authentication and that, in further non-limiting embodiments or aspects, an identification document 100 and/or the user may be authenticated without involving a transaction. In the non-limiting embodiment or aspect shown in FIG. 2A, the transaction is a payment transaction.

The external system 204, in response to the authentication request, determines whether the image data 222 has the at least one predetermined indicia corresponding to at least one invalidation mark 106 on the identification document 100. As discussed herein determining whether the image data 222 has the at least one predetermined indicia includes at least one of the following: determining locations of corners of the identification document 100 from the image data 222; determining a foreground portion of the image data 222 within an interior boundary between the corners and a background portion of the image data 222 within an exterior boundary between the corners; segmenting the foreground portion of the image data 222 and the background portion of the image data 222 into a plurality of segments having a predetermined shape, the shape of each of the plurality of segments corresponding to a shape of the at least one predetermined indicia; determining at least one of a spatial domain image transform and a frequency domain image transform for each of the plurality of segments; and determining a region of interest in the foreground portion of the image data 222 based on whether the at least one of the spatial domain image transform and the frequency domain image transform of any of the plurality of segments in the foreground portion of the image data 222 substantially corresponds to the at least one of the spatial domain image transform and the frequency domain image transform of any of the plurality of segments in the background portion of the image data 222. Examples of spatial domain image transforms include intensity histograms, and examples of frequency domain image transforms include visual saliency based techniques.

After and/or in response to determining that the image data 222 has the at least one predetermined indicia, the external system 204 determines whether the at least one predetermined indicia corresponds to at least one invalidation mark 106 on the identification document 100. The identification document 100 is deemed valid if the image data 222 of the identification document 100 does not have any predetermined indicia corresponding to the invalidation mark 106. Conversely, the identification document 100 is deemed invalid if the image data 222 of the identification document 100 has predetermined indicia corresponding to at least one invalidation mark 106.

After and/or in response to determining that the identification document 100 is valid or invalid based on identifying the absence or presence, respectively, of at least one invalidation mark 106 in the image data 222 of the identification document 100, the external system 204 generates at least one notification 224 that the identification document 100 is valid or invalid. The at least one notification 224 is communicated to the client device 202 via the network environment 208. In response to receiving the notification 224, the client device 202 (and/or electronic transaction application 214) may generate a transaction message 226 comprising transaction data, such as an indication that the identification document 100 was deemed valid or invalid. It will be appreciated that various other arrangements are possible.

In some non-limiting embodiments or aspects, the transaction may be prevented by the transaction processing server 206 in response to receiving the transaction message 226 that the identification document 100 is invalid. In other non-limiting embodiments or aspects, the transaction may be processed by the transaction processing server 206 in response to receiving the transaction message 226 that the identification document 100 is valid. In other non-limiting embodiments or aspects, the client device 202 may also communicate other data for processing the transaction, and the transaction processing server 206 may also authenticate the user through an additional authentication process.

Figure 2B:
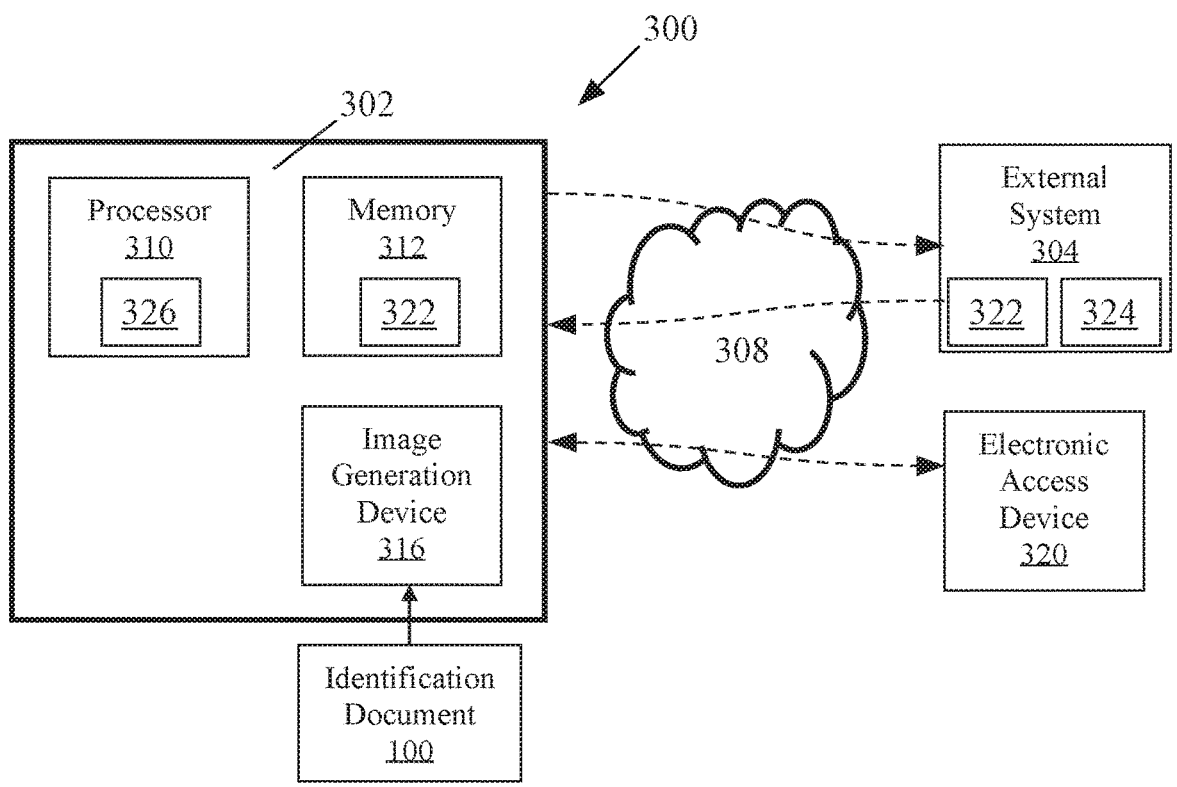
FIG. 2B is a schematic diagram of a system for authenticating identification documents according to another non-limiting embodiment or aspect.

Referring now to FIG. 2B, a system 300 for authenticating an identification document 100 is shown according to another non-limiting embodiment or aspect. In FIG. 2B, the transaction comprises granting access to a facility or system. A client device 302 is in communication with an external system 304 and an electronic access device 320. Although FIG. 2B depicts the external system 304 and the electronic access device 320 separately, it will be appreciated that these components may be part of the same system or device. While FIG. 2B depicts the client device 302 in communication with the external system 304 and the electronic access device 320 via a network environment 308, it will be appreciated that the client device 302 may communicate with the external system 304 and the electronic access device 320 via separate network environments or other communication channels. In some non-limiting embodiments or aspects, the client device 302 may communicate with the electronic access device 320 via Bluetooth®, Near-Field Communication (NFC), a WiFi network, an Internet connection, a wired connection, and/or the like. The client device 302 may additionally or alternatively communicate with a server computer or remote device (not shown in FIG. 2B) that is, in turn, in communication with the electronic access device 320. As used herein, the term "electronic access device" may refer to one or more devices, systems, and/or software applications programmed or configured to grant access to a system or facility. In some non-limiting embodiments or aspects, an electronic access device may include a locking mechanism, a server computer, a mobile device, a software application, and/or the like.

With continued reference to FIG. 2B, the client device 302 includes and/or is in communication with a processor 310, a memory 312, and an image generation device 316. The memory 312 and the image generation device 316 may each be in communication with the processor 310. It will be appreciated that various other arrangements may be used. In non-limiting embodiments or aspects, the processor 310, memory 312, and the image generation device 316 may be integrated with a mobile device, such as a smartphone or wearable device. In some non-limiting embodiments or aspects, the image generation device 316 may include a camera integrated into a mobile device. In other embodiments or aspects, the image generation device 316 may be a camera associated with the mobile device, a scanning device, a laser sensor, an image sensor, or any combination thereof.

Still referring to FIG. 2B, in non-limiting embodiments in which the transaction comprises granting access to a system, the electronic access device 320 may comprise a secure server or computing device. In some non-limiting embodiments or aspects, the electronic access device 320 may comprise a server computer, a local computer, or a mobile device including one or more software applications programmed to grant access to a system based on credentials, an authentication message, a biometric input, an access signal, and/or other like inputs. In non-limiting embodiments or aspects, the electronic access device 320 may comprise the client device 302 itself and/or one or more software applications on the client device 302 configured to grant access to the client device 302 and/or a feature of the client device 302, such as a software application running on the client device 302. In some non-limiting embodiments or aspects, the electronic access device 320 may be a software application or operating system on the client device 302 that unlocks features of the mobile device in response to authenticating a user through an integrated image generation device 316. The external system 304 may include a remote server, the electronic access device 320, or some other source external to the client device 302.

With continued reference to FIG. 2B, in non-limiting embodiments in which the transaction comprises granting access to a facility, the electronic access device 320 may comprise a locking mechanism to lock and/or unlock a door, drawer, cabinet, window, and/or other like enclosure or passageway. In some non-limiting embodiments or aspects, the client device 302 may detect the presence of the electronic access device 320 and, in response, generate a prompt for a user. The electronic access device 320 may additionally or alternatively detect the presence of the client device 302. The user, through the client device 302, provides image data 322 of the identification document 100 to the external system 304.

Still referring to FIG. 2B, in non-limiting embodiments the client device 302 communicates an authentication request to the external system 304. In some embodiments or aspects, the authentication request includes sending image data 322 associated with the identification document 100. The image data 322 may be stored locally on the client device 302 and transmitted to the external system 304. Alternatively, the image data 322 may be captured using the image generation device 316 and transmitted from the client device 302 to the external system 304. In some embodiments or aspects, one or more image processing operations may be performed to the image data 322 prior to or after transmitting the image data 322 to the external system 304.

In some non-limiting embodiments or aspects, and with continued reference to FIG. 2B, the authentication request may be communicated to the external device 304 as part of an access grant request. The external system 304, in response to the authentication request, determines whether the image data 322 has the at least one predetermined indicia corresponding to at least one invalidation mark 106 on the identification document 100. After and/or in response to determining that the image data 322 has the at least one predetermined indicia, the external system 304 determines whether the at least one predetermined indicia corresponds to at least one invalidation mark 106 on the identification document 100. As discussed herein, the identification document 100 is deemed valid if the image data 322 of the identification document 100 does not have any predetermined indicia corresponding to the invalidation mark 106. Conversely, the identification document 100 is deemed invalid if the image data 322 of the identification document 100 has predetermined indicia corresponding to at least one invalidation mark 106.

After and/or in response to determining that the identification document 100 is valid based on identifying the absence of at least one invalidation mark 106 in the image data 322 of the identification document 100, the external system 304 generates an access signal 324 and/or communicates an access signal to the electronic access device 320. An access signal may include, with some embodiments or aspects, a command, an authentication message, user credentials, and/or any other like data that, when received by the electronic access device 320, causes the electronic access device 320 to grant access to a user. Conversely, after and/or in response to determining that the identification document 100 is invalid based on identifying the presence of at least one invalidation mark 106 in the image data 322 of the identification document 100, the external system 304 generates a notification that access is denied. The notification 326 may be communicated to the client device 302. It will be appreciated that various other arrangements are possible.

Image Processing Operations

1. Image Subsampling

Figure 3A:
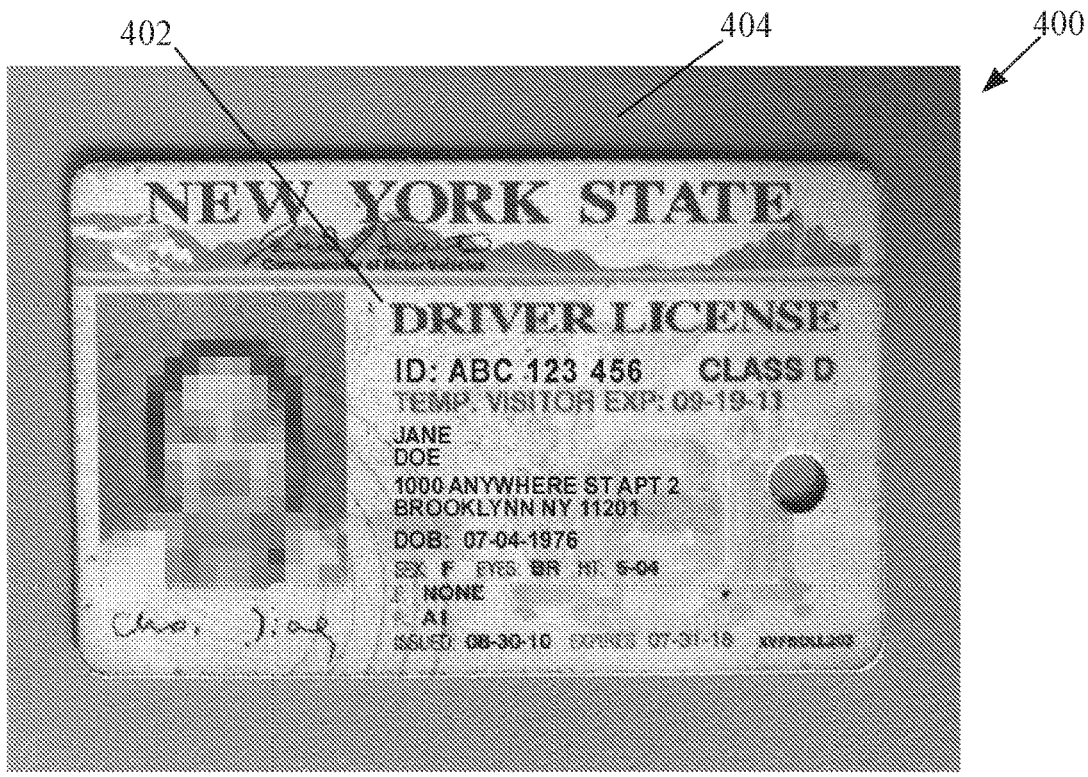
FIG. 3A is a top view of an original image of an invalid identification document.

As discussed herein, one or more image processing operations may be performed to the image data 222, 322 prior to determining whether the image data 222, 322 has any indicia corresponding to the invalidation mark 106. With reference to FIG. 3A, a top view of a representative image 400 of the identification document 100 is shown. In some embodiments or aspects, the image 400 may be one of the following formats: RGB, JPEG, TIFF, GIF, and the like. The resolution of the image 400 corresponding to the identification document 100 which is generated using an image generation device 216, 316, such as a camera of a mobile phone, may be around 8 MB, which is more than what is required for detecting invalidation marks 106. Therefore, it may be desirable to reduce the size of an image file comprising the image data 222, 322 prior to further image processing operations of the image data 222, 322. In some embodiments or aspects, the resolution of the original image 400 of the identification document 100 may be reduced to approximately 750 pixels×1000 pixels before performing subsequent image processing operations.

2. Image Segmentation

Figure 3B:
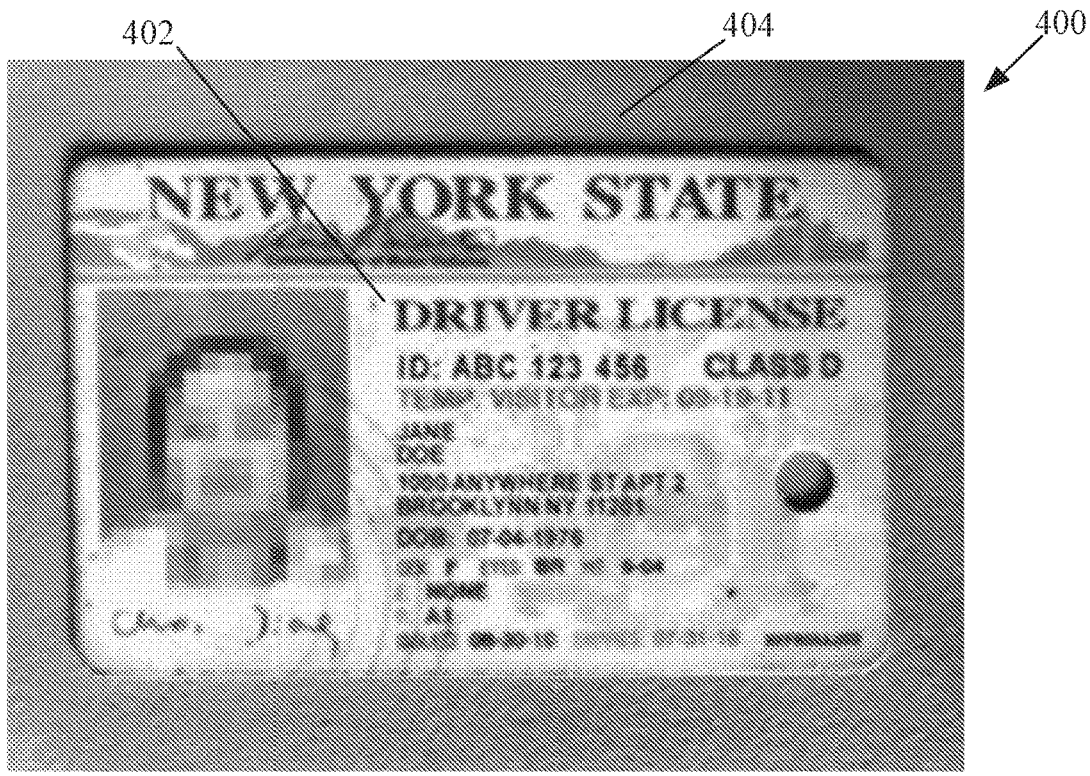
FIG. 3B is a top view of a contrast-enhanced image of a down-sampled version of the invalid identification document shown in FIG. 3A.

Once the image file comprising the image data 222, 322 is subsampled, a foreground portion 402 of the image comprising the image of the identification document 100 is separated from a background portion 404 (FIG. 3B). Typically, the foreground portion 402 includes the identification document 100, while the background portion 404 includes a surface or environment surrounding the identification document 100. In some non-limiting embodiments or aspects, a corner detection technique or a rectangular shape detection technique may be used for separating the foreground portion 402 of the image from the background portion 404 of the image. In some embodiments or aspects, the image 400 may be transformed into a frequency domain using discrete cosine transform. Following such transformation, regions in the image 400 where the coefficients of the transform are significant are identified as being visually salient. A rectangular mask for the foreground is generated based on these regions, with the regions within the rectangular mask being part of the foreground portion 402 of the image 400 and the regions outside the rectangular mast being part of the background portion 404 of the image 400. A corner detector, such as a Harris corner detector, may then be used to separate the foreground portion 402 from the background portion 404. A bounding box is drawn based on the output of the corner detector to identify the foreground portion 402 and the background portion 404.

3. Image Enhancement

With reference to FIG. 3B, the contrast of the image 400 is enhanced in local regions around the edges while keeping the high frequency information in the image intact. Various image processing operations may be used for such enhancement. In some non-limiting embodiments or aspects, de-blurring using image filtering may be used to enhance the image contrast.

4. Grayscale Conversion

Figure 3C:
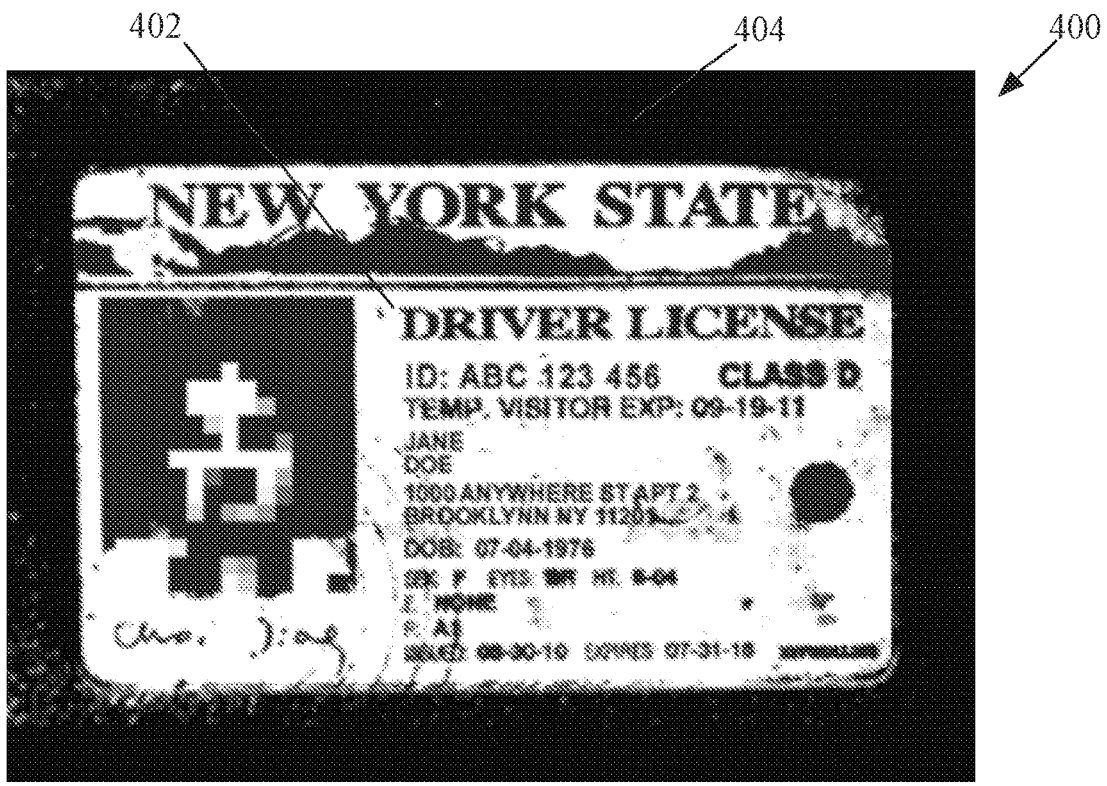
FIG. 3C is a top view of a binarized image of the invalid identification document shown in FIG. 3B.

With reference to FIG. 3C, the image 400, which originally may be a color image in an RGB format, is converted to grayscale. Processing of a grayscale images (8 bit image) is faster than processing of color images (24 bit image).

5. Background Texture Characterization

The texture of the background portion 404 of the image 400 is characterized using an intensity histogram. The peak intensity may be used as a measure to determine whether the background is dark or bright. If the peak intensity is above a predefined upper threshold, the background portion 404 is identified as being "bright", and the predetermined indicia 104 of invalidation marks 106 will have bright intensity characteristics. Conversely, if the peak intensity is below a predefined lower threshold, the background portion 404 is identified as being "dark", and the predetermined indicia of the invalidation marks 106 will have dark intensity characteristics. If the peak intensity is between the two aforementioned upper and lower thresholds, both dark and light predetermined indicia of the invalidation marks 106 will be searched for subsequently. To prevent the presence of small aberrations (noise) from impacting the detection process, the image 400 may be smoothed, such as by applying a Gaussian blur filter. The parameters of the Gaussian blur filter may be selected based on the image size obtained after subsampling the image 400 of the identification document 100.

6. Image Binarization

The grayscale image is converted to a binary image having two intensity values (0 and 255) using an automatically determined threshold, such as using an image processing algorithm based on Otsu's method or an image processing algorithm based on adaptive thresholding. The image binarization increases the speed of a shape-based search for predetermined indicia corresponding to the invalidation mark 106. Using the Otsu's method, the algorithm assumes that the image 400 contains two classes of pixels: foreground pixels and background pixels. Binarization is beneficial to improve efficiency of hole detection because pixel values in the image are binary (0 or 1) instead of a scale range (0-255 in grayscale). An optimum threshold separating the two classes of pixels is calculated so that their combined spread is minimal. An edge detection technique, such as the Canny edge detector, may be used to detect edges in the binarized image. The detection of edges in the binarized image allows for extraction of useful structural information (e.g., predetermined indicia corresponding to the invalidation mark 106) and reduces the amount of data to be processed.

7. Shape-Based Detection

Determining a region of interest 406 in the foreground portion 402 of the image 400 is based on whether the intensity histogram of any of the plurality of segments in the foreground portion 402 of the image 400 substantially correspond to the intensity histogram of any of the plurality of segments in the background portion 404 of the image 400. Depending on the background characterization, dark and/or bright indicia that correspond to the invalidation marks 106 are searched for in the foreground portion 402 of the binarized image 400. Once identified, such dark and/or bright indicia defines a region of interest 406 for determining whether the region of interest 406 corresponds to the at least one predetermined indicia of the invalidation marks 106. In embodiments where the invalidation mark 106 is a circle having a diameter within a predetermined range, the dark and/or bright indicia will have a circular shape. In such embodiments or aspects, circular shapes in the image 400 may be detected using the circular Hough transform (CHT) method. The CHT method is an image processing technique for extracting features having a circular shape. The CHT method detects circular holes of a predetermined radius using a voting mechanism where each edge pixel votes for circles of a specific radius defined by its parametric form. A pixel that gets a maximum "vote" (above a certain pre-specified threshold) is identified as the center of the detected circle. As discussed herein, such a detected circle is identified as a region of interest 406.

In embodiments where the image 400 of the identification document 100 is taken at an angle other than perpendicular relative to a background surface, e.g., where the plane of the image generation device 216, 316 is not parallel to the plane of the background surface on which the identification document 100 is placed, circular invalidation marks 106 may not appear as perfect circles. Instead, circular identification marks 106 may appear in the image 400 as ellipses. An image 400 that is likely to have non-circular invalidation marks 106 may be identified by using gyroscopic measurements of the image generation device 216, 316 when the image 400 is taken. If the image 400 is likely to have non-circular invalidation marks 106, such as elliptical marks, a generalized Hough transform (GHT) method is used for detecting such marks. The GHT method works in a manner similar to the CHT method by having edge pixels "vote" for the center of the ellipse specified by its parametric form. GHT can be used to detect invalidation marks 106 having other regular or irregular geometric shapes that are specified parametrically.

8. Texture-Based Candidate Mark Elimination

Figure 3D:
FIG. 3D is a top view of a processed image of the invalid identification document showing locations of possible invalidation marks.

With reference to FIG. 3D, a plurality of regions of interests 406 may be identified in the foreground portion 402 of the image 400. However, not all regions of interest 406 may be indicative of the invalidation mark 106, for example, if the identification document 100 has features of similar size and shape as the invalidation mark 106. In some embodiments or aspects, the letter "0" or another circular feature on the identification document 100 may be identified as a region of interest 406, even though the letter "0" is not an invalidation mark 106, such as a circular hole punched through the identification document 100.

To detect an actual invalidation mark 106, an expected invalidation mark is generated based on background intensity. It is desirable to eliminate false positive indicia that may have at least one property in common with the actual invalidation mark 106. Determining whether the at least one predetermined indicia is the false positive indicia includes comparing at least one property of the at least one predetermined indicia in a foreground portion of the image data with at least one property of a background portion of the image data. Candidate regions of interest 406 are compared to the expected invalidation mark using various statistics, such as average intensity values, intensity deviation, and 2D cross-correlation. Based on the results of these comparisons, false positive regions of interest 406 can be eliminated.

Method of Authenticating an Identification Document

Figure 4:
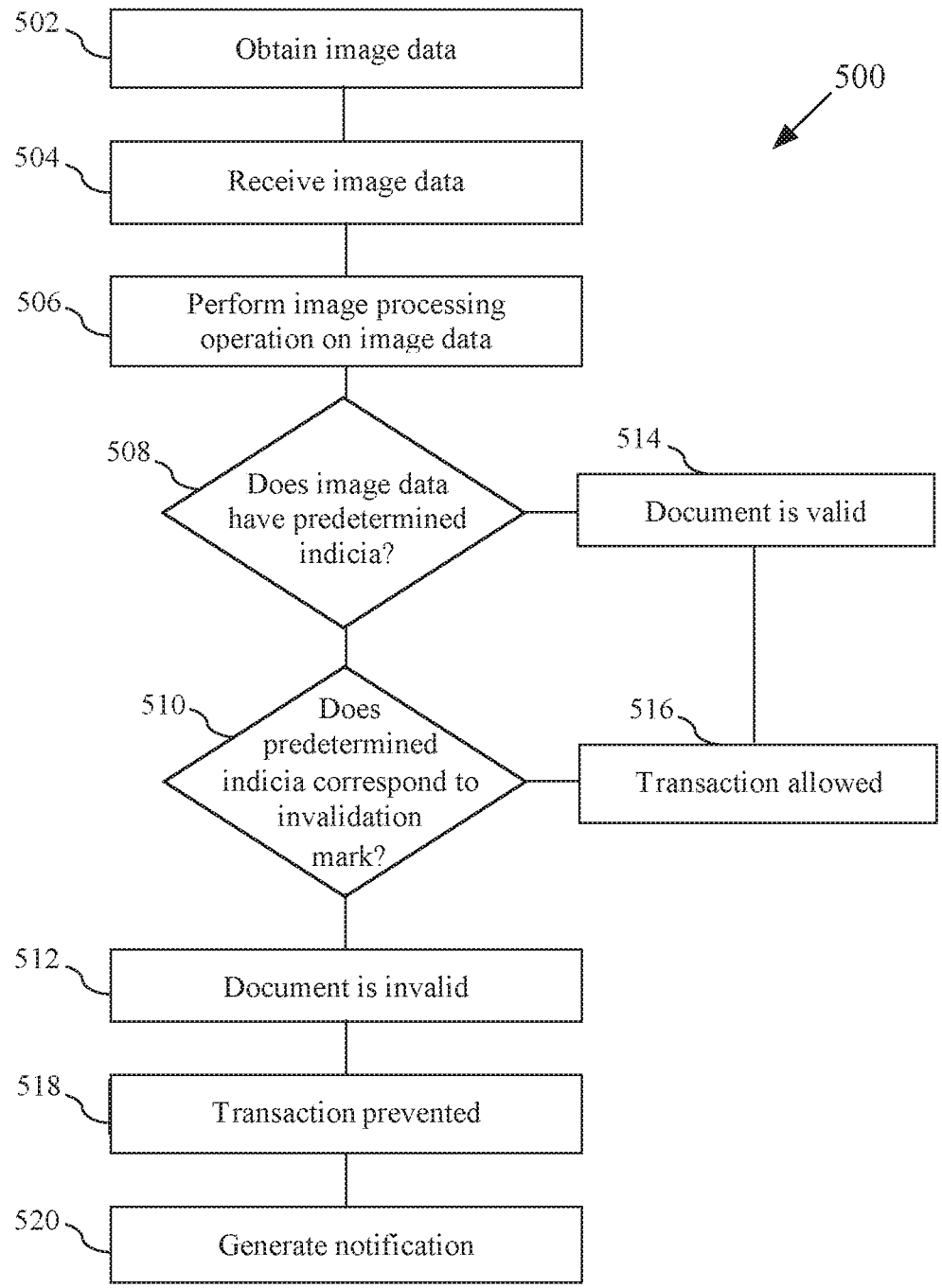
FIG. 4 is a flow diagram of a method for authenticating identification documents according to a non-limiting embodiment or aspect.

Referring now to FIG. 4, a flow diagram for a method for authenticating an identification document is shown according to a non-limiting embodiment or aspect. Prior to initiating the authentication process, a user is prompted to provide an identification document as part of a transaction where additional verification of the user is desired, such as, without limitation, when the at least one transaction comprises a transaction amount greater than a predetermined threshold value, or during issuing of a digital financial instrument to the user. The user may be prompted to provide an image of the identification document 100 to be used as part of an authentication process 500. The authentication process 500 begins with obtaining at least a portion of image data of the identification document 100 using an image generation device 216, 316 at step 502. In some non-limiting embodiments or aspects, a user may use an image generation device, such as a camera on a mobile phone, to capture an image of the identification document 100.

The image data 222, 322 associated with the identification document 100 is received by the client device 202, 302, or the external system 204, 304 at step 504. Receiving the image data 222, 322 of the identification document 100 includes receiving the image data 222, 322 of the identification document 100 from at least one of the following: the image generation device 216, 316, a camera, a scanning device, a laser sensor, an image sensor, or any combination thereof. In some non-limiting embodiments or aspects, image data 222, 322 captured by the user is sent to a remote external system 204, 304.

At step 506, the at least one processor of the client device 202, 302 and/or the external system 204, 304 performs at least one image processing operation on at least a portion of the image data 222, 322. Performing the image processing operation includes at least one of the following: converting the image data 222, 322 to grayscale after receiving the image data 222, 322, performing a blurring operation on the image data 222, 322 (such as a Gaussian blurring operation), performing an edge detection operation on the image data 222, 322, performing a binarization technique on the image data 222, 322, or any combination thereof.

With continued reference to FIG. 4, at step 508, the at least one processor determines whether the image data 222, 322 has at least one predetermined indicia. Determining whether the image data 222, 322 has the at least one predetermined indicia includes at least one of the following: determining locations of corners of the identification document 100 from the image data 222, 322; determining a foreground portion 402 of the image data 222, 322 within an interior boundary between the corners and a background portion 404 of the image data 222, 322 within an exterior boundary between the corners; segmenting the foreground portion 402 of the image data 222, 322 and the background portion 404 of the image data 222, 322 into a plurality of segments having a predetermined shape, the shape of each of the plurality of segments corresponding to a shape of the at least one predetermined indicia; determining an intensity histogram for each of the plurality of segments; and determining a region of interest in the foreground portion 402 of the image data 222, 322 based on whether the intensity histogram of any of the plurality of segments in the foreground portion 402 of the image data 222, 322 substantially corresponds to the intensity histogram of any of the plurality of segments in the background portion 404 of the image data 222, 322.

In response to determining that the image data 222, 322 has the at least one predetermined indicia, the at least one processor determines at step 510 whether the at least one predetermined indicia corresponds to at least one invalidation mark 106 on the identification document 100. Determining whether the at least one predetermined indicia corresponds to at least one invalidation mark 106 on the identification document 100 includes at least one of the following: a circular Hough transform, a generalized Hough transform, integro-differential operator, or any combination thereof.

Conversely, in response to determining that the image data 222, 322 lacks the at least one predetermined indicia, the at least one processor determines that the identification document 100 is valid at step 514. If the at least one processor determines at step 510 that the identification document 100 is valid, the at least one processor may perform an action at step 516 based on determining that the image data 222, 322 lacks the at least one predetermined indicia/invalidation mark 106. The action may be a transaction.

At step 512, in response to determining that the at least one predetermined indicia corresponds to the at least one invalidation mark 106, the at least one processor determines that the identification document 100 is invalid. Based on determining that the identification document 100 is invalid, the at least one processor prevents, or causes the prevention of, at least one action from being performed at step 518. Such action includes at least one of the following: authenticating a user associated with the identification document 100 for at least one transaction, wherein the at least one transaction comprises a transaction amount greater than a predetermined threshold value, authenticating a user associated with the identification document 100 for at least one transaction, wherein the at least one transaction comprises a transaction volume greater than a predetermined threshold value, issuing a digital financial instrument to a user associated with the identification document, storing user profile data of a user associated with the identification document, or any combination thereof. At step 520, the at least one processor transmits, or causes the transmission of, at least one notification to a specified user.

Although the disclosure has been described in detail for the purpose of illustration based on what is currently considered to be the most practical and preferred embodiments or aspects, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

The invention claimed is:

1. A computer-implemented method for authenticating an identification document, the method comprising:
   determining, with at least one processor, whether image data associated with the identification document has at least one predetermined indicia by segmenting a foreground portion of the image data and a background portion of the image data into a plurality of segments having a predetermined shape, the shape of each of the plurality of segments corresponding to a shape of the at least one predetermined indicia, and determining a region of interest in the foreground portion of the image data;
   in response to determining that the image data has the at least one predetermined indicia, determining, with at least one processor, whether the at least one predetermined indicia corresponds to at least one invalidation mark on the identification document;
   in response to determining that the at least one predetermined indicia corresponds to the at least one invalidation mark, determining, with at least one processor, that the identification document is invalid; and
   preventing or causing the prevention of, with at least one processor, at least one action from being performed based on determining that the identification document is invalid.

2. The computer-implemented method of claim 1, further comprising capturing at least a portion of the image data of the identification document using an image generation device.

3. The computer-implemented method of claim 1, wherein determining whether the image data has the at least one predetermined indicia comprises:
   determining, with at least one processor, locations of corners of the identification document from the image data;
   determining, with the at least one processor, the foreground portion of the image data within an interior boundary between the corners and the background portion of the image data within an exterior boundary between the corners;
   generating, with the at least one processor, at least one of a spatial domain image transform and a frequency domain image transform for each of the plurality of segments; and
   determining, with the at least one processor, the region of interest in the foreground portion of the image data based on whether at least one of the spatial domain image transform and the frequency domain image transform of any of the plurality of segments in the foreground portion of the image data substantially corresponds to the at least one of the spatial domain image transform and the frequency domain image transform of any of the plurality of segments in the background portion of the image data.

4. The computer-implemented method of claim 3, further comprising, in response to determining the region of interest in the foreground portion of the image data, determining, with the at least one processor, whether the region of interest corresponds to the at least one predetermined indicia using at least one of the following: a circular Hough transform, a generalized Hough transform, integro-differential operator, or any combination thereof.

5. The computer-implemented method of claim 1, further comprising, in response to determining that the identification document is invalid, generating, with at least one processor, at least one notification that the identification document is invalid.

6. The computer-implemented method of claim 1, further comprising, in response to determining that the image data lacks the at least one predetermined indicia, generating, with at least one processor, at least one notification that the identification document is valid.

7. The computer-implemented method of claim 6, further comprising performing the action based on determining that the image data lacks the at least one predetermined indicia.

8. The computer-implemented method of claim 6, further comprising transmitting or causing the transmission of, with at least one processor, the at least one notification to a specified user.

9. The computer-implemented method of claim 1, further comprising, determining, with the at least one processor, whether the at least one predetermined indicia is a false positive indicia having at least one property corresponding to the at least one invalidation mark.

10. The computer-implemented method of claim 9, wherein determining whether the at least one predetermined indicia is the false positive indicia comprises comparing at least one property of the at least one predetermined indicia in a foreground portion of the image data with at least one property of a background portion of the image data.

11. The computer-implemented method of claim 10, wherein the false positive indicia lacks the at least one property of the background portion of the image data.

12. The computer-implemented method of claim 1, wherein the at least one invalidation mark is a physical invalidation mark.

13. The computer-implemented method of claim 1, wherein the at least one invalidation mark is at least one hole extending at least partially through the identification document.

14. The computer-implemented method of claim 13, wherein the at least one hole has at least one of the following: a circular shape, a curvilinear shape, a polygonal shape, or any combination thereof.

15. The computer-implemented method of claim 1, wherein the identification document is at least one of the following: a driver's license, a passport, a security document, a government-issued document, an identification document, or any combination thereof.

16. The computer-implemented method of claim 1, wherein receiving the image data of the identification document comprises receiving the image data of the identification document from at least one of the following: an image generation device, a camera, a scanning device, a laser sensor, an image sensor, or any combination thereof.

17. The computer-implemented method of claim 1, further comprising performing an image processing operation on at least a portion of the image data after receiving the image data.

18. The computer-implemented method of claim 17, wherein performing the image processing operation comprises at least one of the following:
   performing a subsampling operation on the image data;
   performing an image segmentation operation on the image data;

converting the image data to grayscale after receiving the image data;
performing a blurring operation on the image data;
performing a binarization technique on the image data;
performing an edge detection operation on the image data; or any combination thereof.

19. The computer-implemented method of claim 18, wherein performing the image subsampling operation comprises reducing a size of an image file containing the image data.

20. The computer-implemented method of claim 18, wherein performing the image segmentation operation on the image data comprises separating a foreground portion of the image data from a background portion of the image data using at least one of a spatial domain image transform and a frequency domain image transform.

* * * * *